(12) United States Patent
Allan

(10) Patent No.: US 6,314,821 B1
(45) Date of Patent: Nov. 13, 2001

(54) ANNULAR FLOW MONITORING APPARATUS

(75) Inventor: Joseph Calderhead Allan, Scotland (GB)

(73) Assignee: Expro North Sea Limited (GB)

( * ) Notice: Subject to any disclaimer, the term of this patent is extended or adjusted under 35 U.S.C. 154(b) by 0 days.

(21) Appl. No.: 09/254,308

(22) PCT Filed: Sep. 2, 1997

(86) PCT No.: PCT/GB97/02351

§ 371 Date: May 28, 1999

§ 102(e) Date: May 28, 1999

(87) PCT Pub. No.: WO98/10249

PCT Pub. Date: Mar. 12, 1998

(30) Foreign Application Priority Data

Sep. 3, 1996 (GB) .................................................. 9618344

(51) Int. Cl.[7] .................................. G01F 1/37; G01F 1/44
(52) U.S. Cl. ....................................... 73/861.52; 73/861.63
(58) Field of Search ........................... 73/861.52, 861.58, 73/861.63, 861.64

(56) References Cited

U.S. PATENT DOCUMENTS

| | | | | |
|---|---|---|---|---|
| 3,686,946 | * | 8/1972 | Halmi ................................. | 73/861.64 |
| 3,733,902 | * | 5/1973 | Halmi ................................. | 73/861.64 |
| 4,644,800 | * | 2/1987 | Kozlak ............................... | 73/861.64 |
| 4,757,709 | * | 7/1988 | Czernichow ....................... | 73/861.65 |
| 5,036,710 | * | 8/1991 | King ................................... | 73/861.04 |
| 5,445,035 | * | 8/1995 | Delajoud ............................ | 73/861.52 |

FOREIGN PATENT DOCUMENTS

| | | | | |
|---|---|---|---|---|
| 2261519-A | * | 5/1993 | (GB) ................................. | G01F/1/36 |
| 2263172-A | * | 7/1993 | (GB) ................................. | G01F/1/44 |

* cited by examiner

Primary Examiner—Harshad Patel
(74) Attorney, Agent, or Firm—Piper Marbury Rudnick & Wolfe

(57) ABSTRACT

A flowmeter used to measure the flow rate of a fluid in a conduit includes a flow restrictor insert. The conduit is coupled to an upstream and downsteam conduit portion and includes three pressure measuring stations axially spaced along the conduit wall. The flow restrictor insert includes two cylindrical portions, the second of which has a diameter larger than the first. The flow restrictor insert is positioned in the flowmeter conduit such that the first cylindrical portion is aligned with the second pressure measuring station and the second cylindrical portion is aligned with the third pressure measuring station. When a fluid flows through the conduit, the flow restrictor insert causes the fluid to diverge around the cylindrical portions thereby creating a venturi effect. The fluid flow rate is calculated from the pressure differentials derived from the data measured at the three pressure measuring stations.

8 Claims, 3 Drawing Sheets

ANNULAR FLOW MONITORING APPARATUS

The present invention relates to flow monitoring apparatus for monitoring the flow of fluid in pipes. In particular, the invention is concerned with flow monitoring apparatus in which there are no moving parts and which is based on the venturi principle. The invention also relates to monitoring the flowrate of hydrocarbon products through the downhole pipeline which carries the products from an underground hydrocarbon reservoir and also relates to injection-type wells. In addition, the invention relates to the measurement of the downhole scale thickness. It will be understood that the hydrocarbon products can be in single-phase flow or multi-phase flow and can be an oil/water/gas mixture or a wet or dry/gas mixture.

Applicant's own co-pending British Patent Application No. 9600699.4 discloses an annular flow measurement apparatus and method which is achieved by locating a flow restrictor insert into the bore or a conduit of a pipe with a flow restrictor insert being arranged so as to create an annular flowpath around the insert. In a preferred arrangement, the flow restrictor insert has a leading upstream end which is disposed between first and second pressure monitoring stations, whereby pressures which are measured at these stations can be used to calculate flowrate in accordance with known established methodology. The flow restrictor insert is centrally and axially located in the bore and annular flowrates are created between the flow restrictor insert and the conduit bore wall, thereby eliminating the requirement for seals. With this arrangement the flow restrictor insert may be permanent or wireline retrievable. In addition, with this arrangement it is disclosed in one embodiment that the central flow restrictor insert may be modified to carry pressure gauges so that the entire flow monitoring tool could be wireline retrievable with the central part containing appropriate electronics and memory gauges.

A common problem in oil field production operations is the downhole deposition of solid scales. Such scales include, for example, calcium carbonate and calcium sulphate. Under suitable conditions these scales adhere to the production tubing and casing strings exposed to production fluids. These deposits exhibit considerable strength and commonly entirely coat the production string, thereby reducing the internal diameter for flow. All components exposed to the fluid, including the downhole flowmeter are susceptible to scaling. In most cases, the existence of downhole scaling is unknown, although it may be suspected from scaling tendency calculations. An exact knowledge of scale thickness may therefore not be known. Measured flowrate is extremely sensitive to scale deposition, being proportional to the diameter of the pipe squared and, accordingly, such scale deposition will result in major flowrate errors. Existing flow measurement apparatus does not provide any indication of scale thickness nor of flowrate errors caused by scale deposition.

An object of the present invention is to provide an improved apparatus and method of measuring flowrate which obviates or mitigates at least one of the disadvantages associated with the aforementioned apparatus.

A further object of the present invention is to provide an improved apparatus and method of measuring flowrate which improves flowmeter accuracy by calculating scale thickness and taking account of scale thickness when calculating flowrate measurement.

This is achieved, in one aspect of the invention, by providing a flow restrictor insert into the bore of a conduit or pipe with the flow restrictor insert being arranged so as to create an annular flowpath around the insert, and the flow restrictor insert having at least two substantially co-axial portions of different diameters with sufficient pressure monitoring stations being provided so as to allow the calculation of at least two pressure differentials. This may be implemented by providing three absolute pressure gauges which may be located at three appropriate locations in the bore of a carrier or by using two differential sensors connected to the monitoring stations to calculate pressure differentials from the three bores. The three pressure monitoring bores and two differential pressure sensors may be located within the flow restrictor insert, and pressure sensor being located in respective co-axial portions.

When three pressure sensors are used a third pressure differential can be calculated, although this is not required in the calculation. Redundancy can also be achieved by providing more than two differential pressure sensors. Using standard fluid mechanics analysis, a mathematical model is derived which computes gross flowrate from the three pressure measurements (non-differential) in a scaling environment. A value of scale thickness is a byproduct of the calculation and this is used as the-basis for a downhole scale indicator.

In the absence of scale deposition, or where the scale thickness is known and is assumed to be constant, then the aforementioned design provides flowrate backup in the event of gauge failure. Although scale thickness is not generally known, the thickness is available from this tool prior to gauge failure and can then be used post-failure to generate more accurate flowrates. As an approximation it is possible to extrapolate future deposition behaviour based on data gathered prior to failure.

A solution to the aforementioned problem is also achieved in accordance with another aspect of the invention wherein a multiple venturi flowmeter is used to calculate scale deposition. In this case, the multiple venturi flowmeter has a first throat restriction portion of a first diameter which leads to a second co-axial throat restriction of a second smaller diameter than the first diameter. Two pressure measurement stations are located in the main bore and in the areas opposite the first and second diameters and a third gauge is also located in the flowmeter, either in a converging portion or in a third co-axial portion bore, thus providing three absolute pressure measurements (which can be used to calculate pressure differentials) or two differential pressure measurements by coupling two differential pressure sensors to the three stations. With this arrangement, and from the differential pressures, it is possible to not only calculate flowrate but to take account of the scale thickness using the same mathematical model as described above.

According to a first aspect of the present invention, there is provided a method of monitoring the rate of fluid flow through a conduit, said method comprising the steps of:

providing first, second and third pressure monitoring stations axially spaced apart along said conduit, said first, second and third pressure monitoring stations permitting the measurement of pressure thereat, disposing within the conduit bore a fluid flow restrictor insert, said fluid flow restrictor insert having a first substantially cylindrical section and a second substantially cylindrical section, the first and second cylindrical sections being adapted to be disposed in said bores such that the sections are parallel and the first section is located at a first bore diameter and the second section is located at a second bore diameter when the leading end of the flow restrictor insert is disposed between the first and the second pressure monitoring stations and, when the insert is in this location, the first cylindrical section is disposed substantially opposite the second pressure sensor and the second cylindrical section is disposed substantially opposite the third pressure monitoring station, creating annular flow by the flow restrictor insert in the vicinity of the second and the third pressure monitoring stations to provide a venturi effect thereat and measuring pressures at said first, second and third pressure monitoring stations for deriving at least two pressure differentials for use in determining the flow rate of said fluid and for determining the thickness of any scale disposed in the interior of the carrier bore.

According to a second aspect of the present invention, there is provided a flowmeter for measuring fluid flowrate in a conduit, said flowmeter comprising:

a flowmeter conduit portion for coupling to upstream and downstream conduit portions, said flowmeter conduit portion having first, second and third pressure measuring stations axially spaced along the conduit in the wall of the conduit;

a flow restrictor insert adapted to be located in said conduit bore, said insert having a leading end which is disposed when the insert is located, between the first and the second pressure measuring stations, the insert having a first substantially cylindrical bore portion of a first diameter and a second substantially cylindrical bore portion of a second diameter greater than the first diameter, the arrangement being such that, in use, the insert is shaped to cause fluid flowing towards the leading end to diverge around the flow restrictor in an annular flowpath through a first annular area defined by the diameter of the first substantially cylindrical portion on the conduit bore and through a second annular area defined by the second diameter and the annular bore, the first cylindrical portion being disposed substantially opposite the second monitoring station and the second cylindrical portion being disposed substantially opposite the third pressure monitoring station, whereby a venturi effect is created by the insert, whereby pressure measurement data from the first, second and third pressure measurement stations are used to derive at least two pressure differentials from which fluid flowrates in the conduit and the thickness of any scale on the interior bore of the conduit may be calculated.

Preferably, the flow restrictor is wireline retrievable. Alternatively, the flow restrictor insert is secured within the conduit bore.

Preferably also, the flow restrictor insert is coupled to a downstream carrier which is securable to the conduit wall by locking means. It will be understood that the shape of the flow restrictor insert may be varied as long as the combination of the shape and conduit bore results in a flowmeter which incorporates the venturi principle.

Three pressure measurement stations may incorporate absolute pressure measurement gauges from which differential pressures may be calculated or the stations may be coupled to at least two differential pressure gauges. Alternatively, the pressure measurement stations may be coupled to further differential pressure sensors if an element of redundancy is required.

According to a further aspect of the present invention, there is provided flowmeter apparatus for measuring fluid flowrate in a conduit, said flowmeter apparatus comprising:

a tubular conduit having a first bore portion of a first diameter, a first venturi throat portion coupled to the first diameter portion by a first transition portion, the first venturi throat portion being of smaller diameter than the first diameter portion, a second venturi throat portion coupled to said first venturi throat section by a second transition portion, said second venturi throat portion being of smaller diameter than said first venturi throat portion, a third transition portion coupling the second venturi throat to a second larger diameter, bore portion, first, second and third pressure measurement stations located in said tubular bore, said first pressure measurement station being located in said first diameter bore, said second pressure measurement station being located opposite said first venturi throat portion and said third pressure measurement station being located opposite said second venturi throat portion, said first, second and third measurement stations being used to provide at least two pressure differential values for use in determining the flowrate of said fluid flowing through said flowmeter and for determining the thickness of any scale disposed in the conduit bore.

Advantageously, further measurement stations may be disposed in said flowmeter apparatus for further pressure monitoring so as to provide an increased element of redundancy to provide a measurement of flowrate in the event of pressure sensor failure.

All of the flowmeters defined above operate on the venturi principle. With regard to the flowmeters using the flow restrictor insert, the insert is centrally and axially located in the bore and annular flowrates are created between the flow restrictor insert and the conduit bore wall, thereby eliminating the requirement for seals. A further advantage of these embodiments is that the flow restrictor insert can be wireline retrievable if used on a temporary or permanent basis. The flow restrictor insert can be oriented in the bore such that the leading end is either downstream or upstream.

Preferably also, the flow restrictor insert is coupled to a flow restrictor carrier which is locked to the conduit walls by locking means in the form of dogs which engage the recesses in the conduit wall. Preferably, the flow restrictor has three parallel cylindrical surfaces of different diameters with a pressure measurement station in each cylindrical surface and the flow restrictor is hollow for receiving differential pressure sensors for coupling to the pressure measurement stations and a memory for storing measured pressure differentials. In this configuration the entire flowmeter assembly may be run on wireline; no pressure sensors are required to be disposed in the conduit wall.

With the insert centralised in the bore the respective annuli are of constant size in the vicinity of the respective pressure measuring stations, whether they be in the flow restrictor insert of in the conduit wall.

The flow restrictor insert is coupled to the locking means by a tubular connector which has a plurality of apertures therein through which fluid can flow, the carrier being open so that there is minimal restriction on flow through the carrier.

In the case of the double venturi flowmeter, this may be wireline retrievable or insertable in a similar way to the structure disclosed in applicant's co-pending application No. 9518243.2. It will be appreciated that the pressure measurement stations are disposed in the conduit wall in one embodiment. However, it will also be appreciated that pressure measurement stations may be located in the first, second and third cylindrical throat portions which may also contain at least two differential pressure sensors and a memory for recording the differential pressures so that the entire device may be lowered in wireline and located in the conduit using retractable dogs in a similar way as the flow restrictor insert.

These and other aspects of the invention will become apparent from the following description when taken in combination with the accompanying drawings in which.

Figure 1:
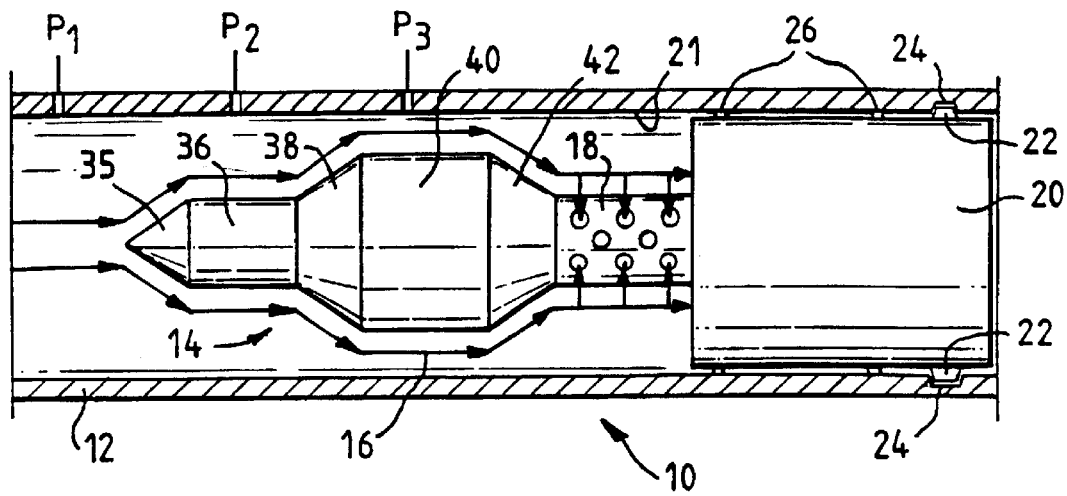
FIG. 1 is a cross-section through a flowmeter in accordance with an embodiment of the present invention incorporated into a conduit.
Figure 2:
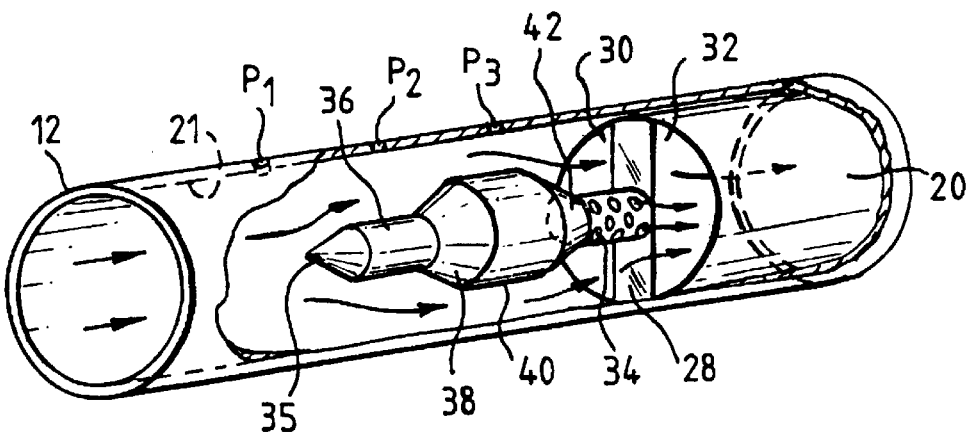
FIG. 2 is a perspective view of the insert in the tube bore of FIG. 1 showing the structure of the carrier and flow paths through the carrier.

Reference is first made to FIG. 1 of the drawings which is a cross-sectional view through a flowmeter, generally indicated by reference numeral 10, which consists of part of a pipeline conduit 12 having three pressure measurement stations P1, P2 and P3 spaced apart axially along the wall of the conduit 12. Conduit, 10 is coupled to adjacent pipe sections (not shown in the interests of clarity). Within the conduit 10 a flow restrictor insert, generally indicated by reference numeral 14, is located. The flow restrictor insert 14 consists of a centralised generally tubular portion 16 which is connected by an intermediate portion 18 to a flow restrictor carrier or lock, generally indicated by reference numeral 20. The carrier 20 is located within the bore 12 by means of locking dogs 22 engaging with recesses 24 in the conduit bore 12. The flow restrictor portion 16 is centralised within the conduit bore by means of centralising buttons, generally indicated by reference numeral 26, disposed between the carrier 20 and the interior surface 21 of the conduit. FIG. 2 shows that the carrier 20 is generally cylindrical with a cross-piece 28 supporting the intermediate portion 18 to define fluid flow passages 30 and 32 on either side of the intermediate portion 18. The intermediate portion 18 is also hollow and has apertures 34 so that the fluid may flow into the carrier where it combines with fluid flowing through passages 30 and 32.

As can be seen from FIGS. 1 and 2, the flow restrictor tubular portion 16 consists of a tapered leading end 35 which is coupled to a first cylindrical portion 36 of diameter 1.6" the surface of which is co-axial with the bore of the conduit 12. The cylindrical portion 36 is connected via a diverging transition portion 38 to a second cylindrical portion 40 of a second diameter (1.7"), greater than the diameter of portion 36, such that the cylindrical surfaces create a second surface which is co-axial with the conduit bore 12. Cylindrical portion 40 is coupled to intermediate portion 18 via a converging section 42.

As best seen in FIG. 1 three pressure monitoring stations P1, P2 and P3 are disposed in the conduit 12 such that station P1 lies upstream of leading end 35 when the carrier is secured in the conduit, pressure measurement station P2 is disposed opposite first cylindrical or parallel portion 36 and the third pressure measurement station, P3, is disposed opposite the second cylindrical portion 40.

In operation, when fluid flows downstream through the pipe as shown in FIGS. 1 and 2, the fluid firstly flows past pressure measurement station P1 which measures the absolute bore pressure P1. The fluid flow is then diverted by the leading end past the first cylindrical portion 36 and through an annulus defined by cylindrical portion 36 and the conduit bore 12. Pressure measurement station P2 measures the absolute pressure in this annulus region. The fluid then flows past diverging transition portion 38 and is constrained to flow past the larger diameter cylindrical portion 40 which definer a reduced annular area between that portion and the tubular bore 12. The third pressure measurement station P3 measures the absolute pressure in this annular region. Thus, three pressure measurements are taken and from these three absolute pressure measurement stations, flowrate and scale thickness can be calculated according to the formula hereinafter defined.

Referring to FIG. 1, the theoretical basis for the calculation of gross flowrate (q) and scale thickness ($\delta_s$) requires the measurement of two pressure differentials. This can be achieved using the three absolute pressure gauges as described or by using two differential pressure gauges. The analysis set forth below assumes use of three absolute pressure gauges. Using pressure measurements calculate the pressure differentials ($\Delta P$) between P1, P2, and between P2 and P3:

$$\Delta P_{12} := P_1 - P_2 \text{ lb/ft2}$$

$$\Delta P_{23} := P_2 - P_3 \text{ lb/ft2}$$

Guess a value for scale thickness ($\delta$):

$$\delta_s := 0.01 \text{ ft}$$

The actual diameters of the conduit at location of sensors P1, P2 and P3 namely D1, D2, D3 respectively are computed from the machined diameters and assumed scale thickness:

$$D_1 := D_{m1} - 2 \cdot \delta_s \text{ ft}$$

$$D_2 := D_{m2} - 2 \cdot \delta_s \text{ ft}$$

$$D_3 := D_{m3} - 2 \cdot \delta_s \text{ ft}$$

The actual diameters of the insert d1, d2, d3 are computed from the machined diameters and assumed scale thickness:

$$d_1 := 0 \text{ ft}$$

$$d_2 := d_{m2} + 2 \cdot \delta_s \text{ ft}$$

$$d_3 := d_{m3} + 2 \cdot \delta_s \text{ ft}$$

The equivalent hydraulic diameters are calculated for use in the venturi equation:

$$D_{e1} := (D_1^2 - d_1^2)^{0.5} \text{ ft}$$

$$D_{e2} := (D_2^2 - d_2^2)^{0.5} \text{ ft}$$

$$D_{e3} := (D_3^2 - d_3^2)^{0.5} \text{ ft}$$

The equivalent hydraulic areas are then calculated for use in the venturi equation:

$$A_{e1} := \pi/4 D_{e1}^2 \text{ ft2}$$

$$A_{e2} := \pi/4 D_{e2}^2 \text{ ft2}$$

$$A_{e3} := \pi/4 D_{e3}^2 \text{ ft2}$$

The $\beta$ ratio is calculated for use in the venturi equation:

$$\beta_2 := D_{e2}/D_{e1}$$

$$\beta_3 := D_{e3}/D_{e2}$$

With this information the flowrate (q) is calculated between locations 1,2 using the venturi equation:

$$q_{12} = c_d \cdot \frac{A_{e2}}{\sqrt{1-\beta_2^4}} \cdot \sqrt{2 \cdot g \cdot \left(\frac{\Delta P_{12}}{\rho_L}\right)} \text{ ft3/sec}$$

Similarly, the flowrate (q) between locations 2,3 is calculated from $$q_{23} = c_d \cdot \frac{A_{e3}}{\sqrt{1-\beta_3^4}} \cdot \sqrt{2 \cdot g \cdot \left(\frac{\Delta P_{23}}{\rho_L}\right)} \text{ ft3/sec}$$

If q12=q23 then the assumed value of scale thickness δs is correct. If q12 does not equal q23, we go back and input another value for δs. This is repeated until q12=q23. Thus, it can be seen that this is an iterative procedure which is terminated only when q12=q23. When this occurs, the last selected scale thickness is assumed to be the correct value. The pressure measurements which are performed downhole may be stored downhole for subsequent retrieval and processing to provide flowrate and scale thickness as will be described.

In the above formulae the following nomenclature is used:

| Variable | Meaning | Units |
|---|---|---|
| D | Conduit diameter | ft |
| d | dart diameter | ft |
| p | pressure | lb/ft2 |
| A | flow area | ft2 |
| q | gross flowrate | ft3/sec |
| cd | discharge coefficient | |
| g | gravitational const (32.2) | ft/s2 |
| | Subscripts | |
| 1,2,3 | location | |
| m | machined diameter | |
| s | scale | |
| e | equivalent | |
| L | liquid | |
| | Greek | |
| Δ | differential | ft |
| δ | scale thickness | ft |
| β | beta factor | |
| ρ | liquid density at meter conditions of P,T | lb/ft3 |

Having now present the theoretical basis for gross flowrate (q) and scale thickness (δ) calculation above, and referring to FIG. 2, it will be seen that the flowrate continues past intermediate portion 18 through passages 30 and 32 and also through apertures 34 in intermediate portion 18. It will be appreciated that the flow restrictor 14 creates a double venturi effect; firstly in the annular region between cylindrical portion 36 which is measured by pressure P2 and, secondly in the annular region at cylindrical portion 40 which is measured by pressure measurement sensor P3.

Figure 3:
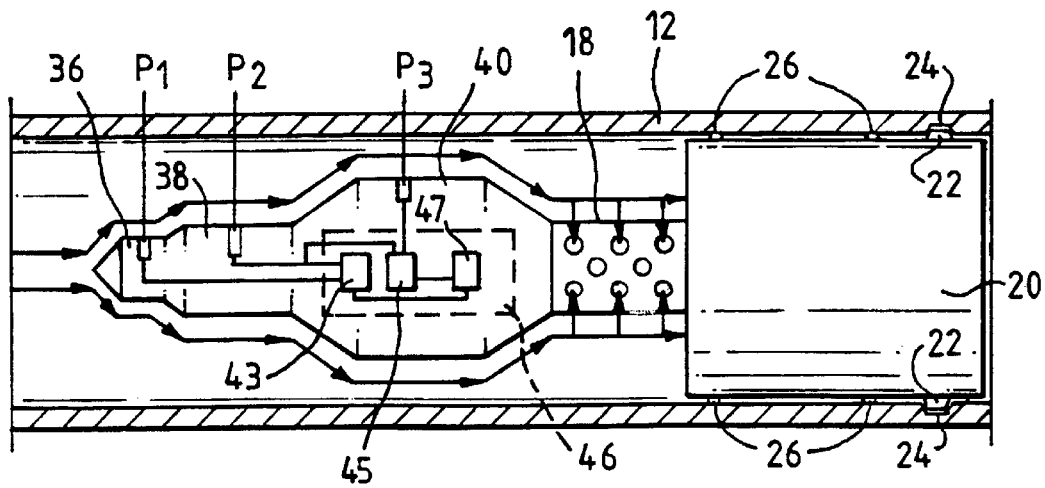
FIG. 3 is an alternative embodiment of a flowmeter in accordance with the present invention with three pressure sensor ports located on the flow restrictor insert.

It will be appreciated that the three pressure measurement stations can be used with two differential pressure sensors to calculate two differential pressures as will be described with reference to the embodiment shown in FIG. 3, as follows, which depicts a flowmeter similar to that shown in FIGS. 1 and 2, except that the flowmeter is entirely wireline retrievable. In this case, pressure measurement stations or ports P1, P2 and P3 are located in the cylindrical portions 36, 38 and 40 respectively and the outputs of the ports P1, P2 and P3 are coupled to differential pressure sensors 43,45 in electronic circuitry 46 (shown in broken outline). The differential pressure sensors 43,45 store differential pressures between sensors P1, P2 ($\Delta P_{12}$) and between sensors P2, P3 ($\Delta P_{23}$) respectively. The circuitry 46 contains a memory 47 which stores the differential pressure signals at various times during the flow monitoring procedure and which processes the information to calculate scale thickness as described above. The memory 47 is sufficient to record the signals over a desirable measurement period and thereafter the flowmeter insert 14 may be retrieved in wireline to the surface and interrogated before being re-utilised for further flow measurement conditions. An advantage of this arrangement is that it is unnecessary to construct a conduit with pressure measuring sensors in place nor for coupling these sensors to surface. The entire arrangement can be run on wireline which is particularly suitable for 'DST' applications.

With the flowmeter structure shown in FIGS. 1 and 2 it is assumed that the meter generates the differential pressure profile, for a fluid density of 60 lb/ft 3 Table 1 below:

TABLE 1

| Time (Years) | DP12 (psi) | DP23 (psi) |
|---|---|---|
| 1 | 11 | 5 |
| 2 | 15 | 8 |
| 3 | 19 | 11 |
| 4 | 23 | 14 |
| 5 | 26 | 17 |
| 6 | 40 | 47 |
| 7 | 54 | 77 |
| 8 | 68 | 107 |
| 9 | 94 | 164 |

Figure 4:
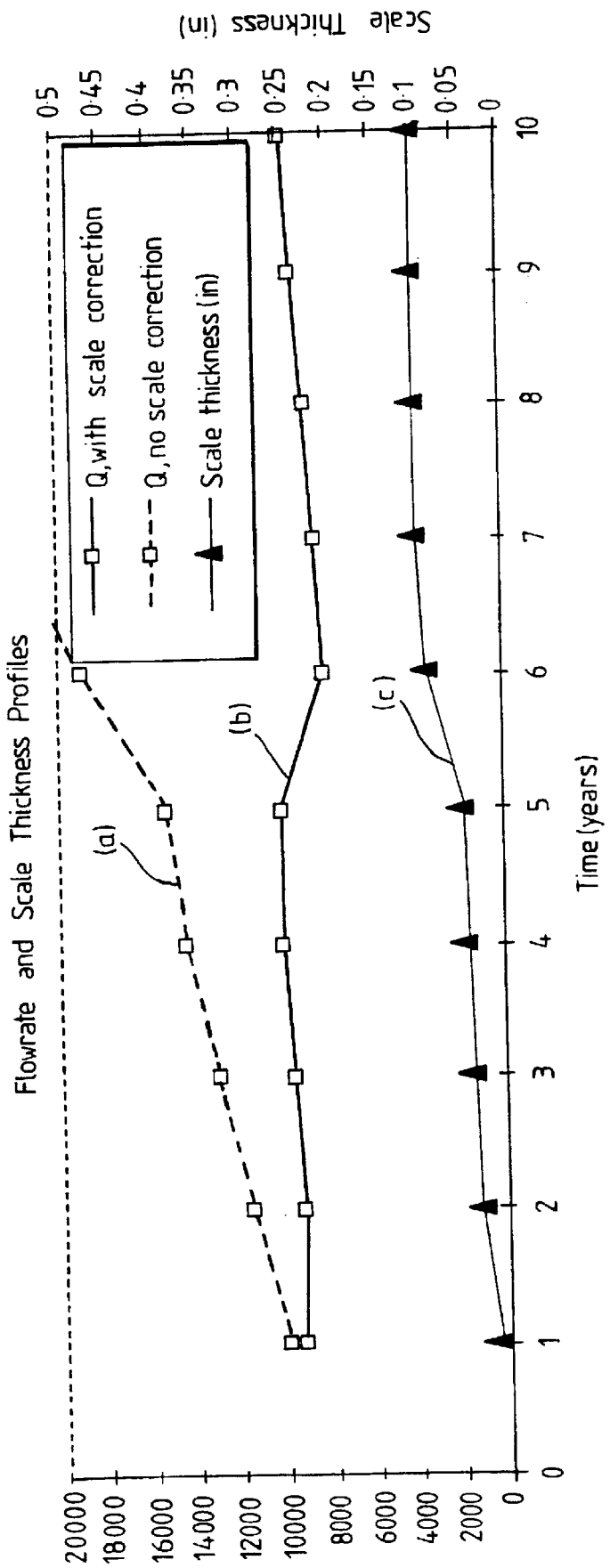
FIG. 4 is a graph of computer flowrate and scale thickness with computed flowmeter shown in FIG. 1.

The computed flowrate (q) and scale thickness ($\delta_s$) profiles are shown in FIG. 4. Flowrate (q) in barrels/day is the left vertical axis and scale thickness (δ) in inches is the right vertical axis. The broken line (a) represents the output from a conventional flowmeter which provides only a single pressure differential measurement. These computed values may be considered erroneous because the existence of scale is not accounted for. The upper solid line (b) indicates the true flowrate which is computed from the modified annular flowmeter shown in FIGS. 1 to 3 with scale depositions catered for in the calculation. It can be seen that there are large differences between the two flowrate measurements. Scale thickness against time is plotted on the lower solid line (c). It will be seen that scale thickness in inches increases over a number of years.

Figure 5:
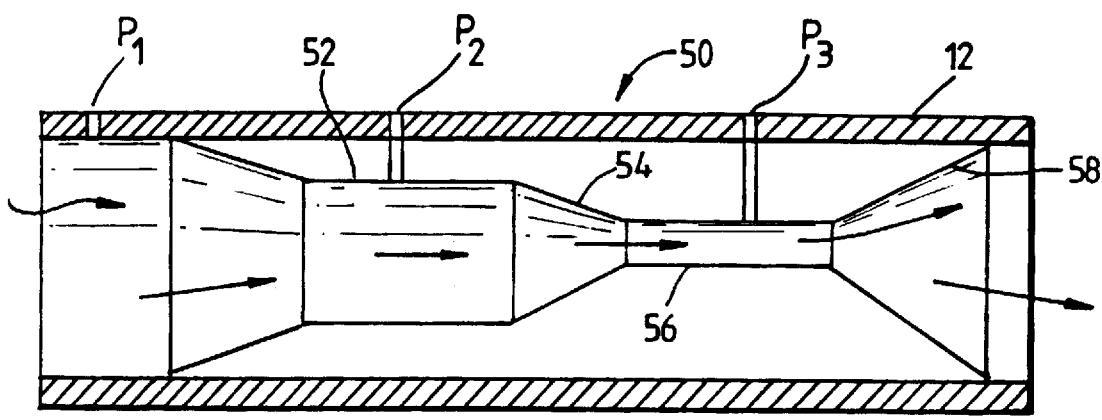
FIG. 5 is an embodiment of an alternative aspect of the present invention used for determining scale thickness and based on a double venturi flowmeter.
Figure 6:
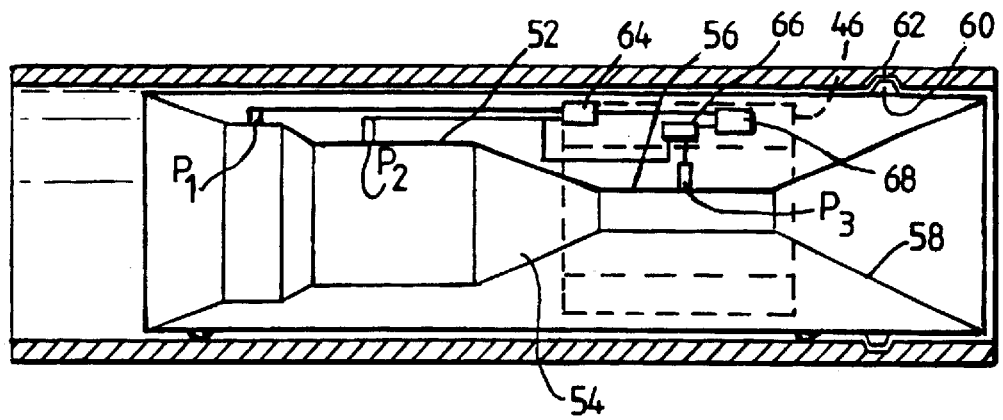
FIG. 6 is an alternative embodiment to the flowmeter shown in FIG. 5 with three pressure sensor ports located in the respective flowmeter parallel portions.

Reference is now made to FIGS. 5 and 6 of the accompanying drawings which relate to an alternative embodiment of flowmeter for determining scale thickness and for measuring flowrate in the conduit. Firstly, referring to FIG. 5, it will be seen that this is a double venturi flowmeter, generally indicated by reference numeral 50. In this case, the flowmeter is coupled to the conduit 12. The flowmeter 50 consists of two venturi portions; a first venture throat portion 52 which has a bore of a first diameter which is then coupled via a convergent portion 54 to a second venturi throat portion, generally indicated by reference numeral 56, and which has a bore of smaller diameter than the first venturi throat portion. Throat portion 56 diverges via divergent portion 58 to full bore size.

Pressure measurement stations P1, P2 and P3 are disposed in the tubular section as shown such that P1 is located in the full bore prior to the entrance of the flowmeter, pressure measurement centre P2 is disposed such that it measures pressures in the venturi throat section 54 and, similarly, P3 measures pressures in the venturi throat section 56. It will be appreciated that as fluid flows in the direction of the arrows through the flowmeter 50, pressures at pressure measurement stations P1, P2 and P3 are used to calculate two pressure differentials which are, in turn, used to calculate the flowrate in accordance with the aforementioned formula and also scale thickness. This flowmeter may also be wireline retrievable.

Reference is now made to FIG. 6 which shows a similar structure to the venturi flowmeter shown in FIG. 5, except that the venturi flowmeter in FIG. 6 is totally self-contained and wireline retrievable and the flowmeter may be located in the conduit by means of dogs 60 engaging recesses 62 in the tubular portion as shown. In this case, three pressure measurement stations or ports P1, P2 and P3 are located in the respective parallel different diameter throat sections 52, 54 and 56 respectively. The ports P1, P2 and P3 are coupled to differential pressure sensors 64,66; sensor 64 measuring $\Delta P_{12}$ and sensor 66 measuring $\Delta P_{23}$. The results may be stored in memory 68 and which can be used subsequently, i.e. at surface, to calculate the flowrate of fluid flowing through the venturi flowmeter or pipeline and also the scale thickness so that appropriate compensation or correction may be carried out to obtain the true flowrate.

It will be appreciated that various modifications may be made to the apparatus hereinbefore described without departing from the scope of the invention. For example, three pressure measurement sensors are used to obtain two pressure differential measurements used in the calculations. It will be appreciated that flowrate and scale thickness may be calculated from measurements from four or more pressure measurement sensors and that such additional measurements will provide an element of redundancy. A reduced element of redundancy (single) is already provided with the three measurement stations. It will also be appreciated that the ports need not be located in parallel surfaces in the embodiments, especially with the structure described with reference to FIGS. 3 and 6, although the best results are obtained when such ports are located in parallel surfaces of different diameters. This may be applied to all of the embodiments. It will also be appreciated that the flowmeter may be used in a temporary situation, for example in DST applications when a tool can be lowered on wireline, measurements taken and retrieved and in this case it is envisaged that the embodiments disclosed in FIGS. 3 and 6 will be particularly appropriate. Alternatively, the improved flowmeter may be used in permanent monitoring situations. Even in permanent monitoring situations, the flowmeters can be wireline retrievable. In such a case, electronically stored data may be transferred from the probe inductively to receivers on the outside of the conduit and the signals transferred by cable to surface.

It will also be appreciated that the cylindrical surfaces need not be exactly cylindrical; they may be hexagonal, octagonal or the like.

The improved flowmeter hereinbefore described has a number of advantages over existing prior art flowmeters. Firstly, there is automatic compensation for scale deposition within the flowmeter providing improved meter accuracy; three pressure measurement stations or ports allow calculation of at least two differential pressures so that there is backup of flowrate measurement and scale thickness in the event of a gauge failure, thus providing the measurement system with redundancy. A further advantage is that the flowmeter can be used to provide an indication of downhole scale. A principal advantage of the invention hereinbefore defined is when the embodiments are used with wireline retrievable tools.

What is claimed is:

1. A method of monitoring the rate of fluid flow through a conduit, said method comprising the steps of:

providing first, second and third pressure monitoring stations axially spaced apart along said conduit, said first, second and third pressure monitoring stations permitting the measurement of pressure thereat, disposing within the conduit bore a fluid flow restrictor insert, said fluid flow restrictor insert having a first substantially cylindrical section and a second substantially cylindrical section greater in diameter than the first substantially cyclindrical section, the first and second cylindrical sections being adapted to be disposed in said conduit bore such that the sections are parallel and the first section is located at a first bore diameter and the second section is located at a second bore diameter when the leading end of the flow restrictor insert is disposed between the first and the second pressure monitoring stations and, when the insert is in this location, the first cylindrical section is disposed substantially opposite the second pressure monitoring station and the second cylindrical section is disposed substantially opposite the third pressure monitoring station, creating annular flow by the flow restrictor insert in the vicinity of the second and the third pressure monitoring stations to provide a venturi effect thereat and measuring pressures at said first, second and third pressure monitoring stations for deriving at least two pressure differentials for use in determining the flow rate of said fluid and for determining the thickness of any scale disposed in the interior of the carrier bore.

2. A flowmeter for measuring fluid flowrate in a conduit, said flowmeter comprising:

a flowmeter conduit portion for coupling to upstream and downstream conduit portions, said flowmeter conduit portion having first, second and third pressure measuring stations axially spaced along the conduit in the wall of the conduit;

a flow restrictor insert adapted to be located in said conduit bore, said insert having a leading end which is disposed when the insert is located, between the first and the second pressure measuring stations, the insert having a first substantially cylindrical portion of a first diameter and a second substantially cylindrical portion of a second diameter greater than the first diameter, the arrangement being such that, in use, the insert is shaped to cause fluid flowing towards the leading end to diverge around the flow restrictor in an annular flow-path through a first annular area defined by the diameter of the first substantially cylindrical portion and the conduit bore and through a second annular area defined by the second diameter of the second substantially cylindrical portion and the conduit bore, the first cylindrical portion being disposed substantially opposite the second monitoring station and the second cylindrical portion being disposed substantially opposite the third pressure monitoring station, whereby a venturi effect is created by the insert, whereby pressure measurement data from the first, second and third pressure measurement stations are used to derive at least two pressure differentials from which fluid flowrates in the conduit and the thickness of any scale on the interior bore of the conduit may be calculated.

3. A flowmeter as claimed in claim 2 wherein the flow restrictor is wireline retrievable.

4. A flowmeter as claimed in claim 2 wherein the flow restrictor is wireline retrievable.

5. A flowmeter as claimed in claim 2 wherein the flow restrictor insert is coupled to a downstream carrier which is securable to the conduit wall by the locking means.

6. A flowmeter as claimed claim 2 wherein three pressure measurement stations incorporate absolute pressure measurement gauges from which differential pressures are calculated.

7. A flowmeter as claimed in claim 6 wherein the pressure measurement stations are coupled to further differential pressure sensors when an element of redundancy is required.

8. A flowmeter as claimed in claim 2 wherein said three pressure measurement stations are coupled to at least two differential pressure gauges.

* * * * *